United States Patent
Pecen

(10) Patent No.: US 8,953,611 B2
(45) Date of Patent: *Feb. 10, 2015

(54) METHODS AND APPARATUS FOR INCREASING DATA THROUGHPUT BY GROUPING DATA PACKETS INTO MAXIMUM TRANSMISSIBLE UNITS

(75) Inventor: Mark Pecen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 100 days.

This patent is subject to a terminal disclaimer.

(21) Appl. No.: 13/296,660

(22) Filed: Nov. 15, 2011

(65) Prior Publication Data

US 2012/0057512 A1 Mar. 8, 2012

Related U.S. Application Data

(63) Continuation of application No. 11/760,376, filed on Jun. 8, 2007, now Pat. No. 8,081,588.

(60) Provisional application No. 60/882,370, filed on Dec. 28, 2006.

(51) Int. Cl.
*H04L 12/28* (2006.01)
*H04W 28/06* (2009.01)
(Continued)

(52) U.S. Cl.
CPC .............. *H04W 28/06* (2013.01); *H04L 47/10* (2013.01); *H04L 47/14* (2013.01); *H04L 47/36* (2013.01);
(Continued)

(58) Field of Classification Search
CPC ....... H04L 47/10; H04L 47/36; H04L 47/624; H04L 49/90; H04L 47/215; H04L 47/22; H04W 28/06

USPC ......... 370/310, 230, 252, 232–235, 329, 229, 370/477, 411–419, 466, 394

See application file for complete search history.

(56) References Cited

U.S. PATENT DOCUMENTS 5,175,692 A 12/1992 Mazouz et al.
5,727,002 A 3/1998 Miller et al.
(Continued)

FOREIGN PATENT DOCUMENTS

EP 1458166 A1 9/2004
EP 1613002 A1 1/2006
(Continued)

OTHER PUBLICATIONS

Search Report & Written Opinion, EP Application No. 07719931.3, Jul. 9, 2009.
(Continued)

*Primary Examiner* — Kwasi Karikari
*Assistant Examiner* — Edward Zhang
(74) *Attorney, Agent, or Firm* — Ridout & Maybee LLP

(57) ABSTRACT

A technique for use in a communication device for communicating data involves receiving a plurality of transport data packets in an ordered sequence; rearranging at least some of the transport data packets in a group with a reordered sequence different from the ordered sequence, for increasing the total size of the group to be at or near a maximum transmissible unit size of a transport data frame; formatting the transport data packets of the group having the total size at or near the maximum transmissible unit size into the transport data frame, for data transmission from the communication device; and repeating, for a plurality of transport data frames, the acts of rearranging and formatting, for communicating the data.

16 Claims, 9 Drawing Sheets

(51) Int. Cl.
*H04L 12/801* (2013.01)
*H04L 12/805* (2013.01)
*H04L 12/863* (2013.01)
*H04L 12/861* (2013.01)
*H04W 80/00* (2009.01)
*H04W 80/02* (2009.01)

(52) U.S. Cl.
CPC .............. *H04L 47/624* (2013.01); *H04L 49/90* (2013.01); *H04L 49/9094* (2013.01); *H04W 80/00* (2013.01); *H04W 80/02* (2013.01)
USPC ........... 370/394; 370/310; 370/230; 370/252; 370/232; 370/233; 370/234; 370/235; 370/329; 370/229

(56) References Cited

U.S. PATENT DOCUMENTS

| | | | |
|---|---|---|---|
| 5,936,863 | A | 8/1999 | Kostelnik et al. |
| 6,366,931 | B1 | 4/2002 | Borowsky et al. |
| 6,385,673 | B1 * | 5/2002 | DeMoney ................ 710/60 |
| 6,526,420 | B2 | 2/2003 | Borowsky et al. |
| 6,707,869 | B1 | 3/2004 | Zhang |
| 6,876,958 | B1 | 4/2005 | Chowdhury et al. |
| 6,901,081 | B1 | 5/2005 | Ludwig |
| 7,154,868 | B1 | 12/2006 | Sharma et al. |
| 2002/0101820 | A1 * | 8/2002 | Gupta et al. .................. 370/229 |
| 2003/0035420 | A1 | 2/2003 | Niu |
| 2004/0100991 | A1 * | 5/2004 | Samadi et al. ................ 370/473 |
| 2004/0180696 | A1 * | 9/2004 | Foore et al. .................... 455/561 |
| 2005/0152358 | A1 | 7/2005 | Giesberts et al. |
| 2006/0153232 | A1 | 7/2006 | Shvodian |
| 2006/0215662 | A1 * | 9/2006 | Zhang et al. .................. 370/394 |
| 2006/0245384 | A1 * | 11/2006 | Talukdar et al. ............. 370/310 |
| 2007/0025301 | A1 | 2/2007 | Petersson et al. |
| 2007/0076625 | A1 * | 4/2007 | Tahara et al. ................. 370/252 |
| 2007/0076626 | A1 | 4/2007 | Wise et al. |
| 2007/0263558 | A1 | 11/2007 | Salomone |
| 2007/0297358 | A1 | 12/2007 | Chang et al. |
| 2008/0096580 | A1 | 4/2008 | Montemurro |
| 2008/0176579 | A1 | 7/2008 | Abdel-Kader |

FOREIGN PATENT DOCUMENTS

| | | |
|---|---|---|
| EP | 1104141 A2 | 5/2007 |
| EP | 1978676 A1 | 10/2008 |
| GB | 2315964 A | 2/1998 |
| WO | 03043258 A1 | 5/2002 |
| WO | 2005002148 A1 | 1/2005 |
| WO | 2005004500 A2 | 1/2005 |
| WO | 2006117644 A1 | 11/2006 |
| WO | 2007036046 A1 | 4/2007 |

OTHER PUBLICATIONS

Kim et al., "Throughput Enhancement of IEEE 802.11 WLAN Via Frame Aggregation", pp. 3030-3034, 2004.
Search Report & Written Opinion, PCT Application No. PCT/CA2007/001015, Sep. 28, 2007.
International Preliminary Report on Patentability, PCT Application No. PCT/CA2007/001015, Jun. 30, 2009.
Gantovnik et al., "Multi-Objective Vehicle Layout Optimization", Dated 2005, Department of Mechanical Engineering.
Giemsch et al., "Optimization Models for the Containership Stowage Problem", Dated Sep. 2-5, 2003.

* cited by examiner

FIG. 1
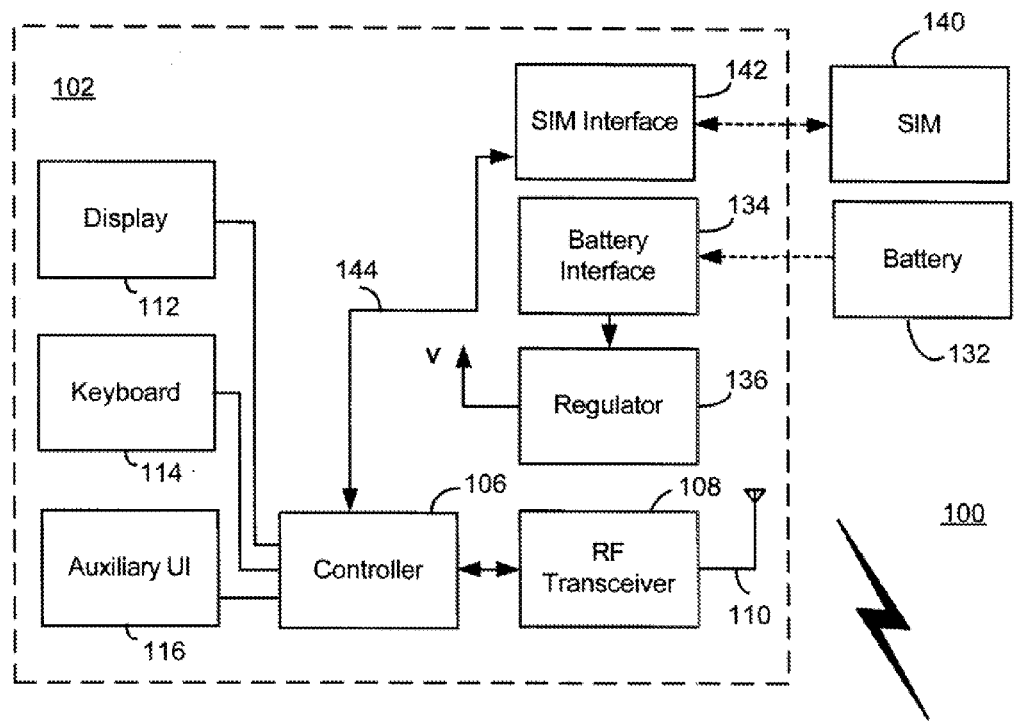
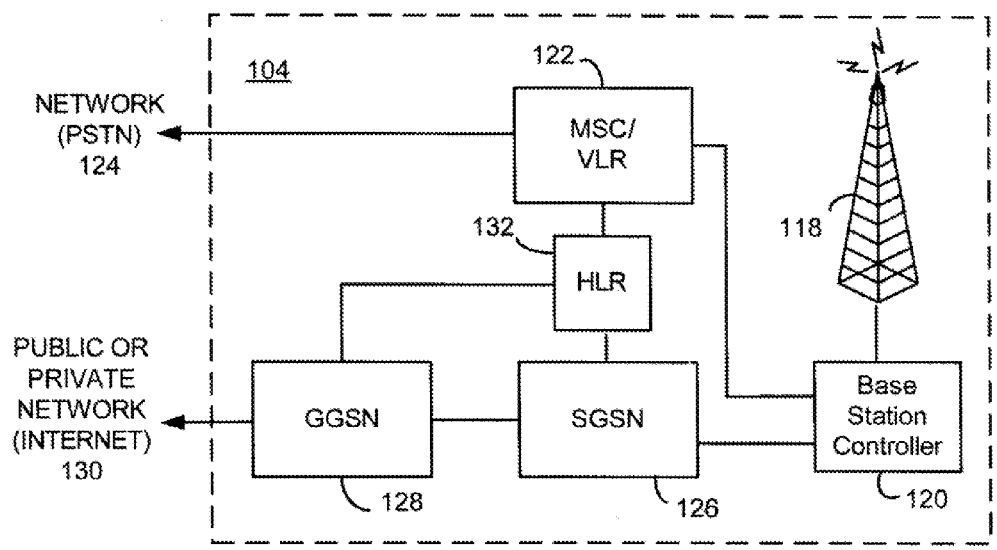

METHODS AND APPARATUS FOR INCREASING DATA THROUGHPUT BY GROUPING DATA PACKETS INTO MAXIMUM TRANSMISSIBLE UNITS

CROSS-REFERENCE TO RELATED APPLICATIONS

The present application is a continuation of and claims priority to a U.S. Non-Provisional patent application having application Ser. No. 11/760,376 and filing date of 8 Jun. 2007, now U.S. Pat. No. 8,081,588, which claims priority to U.S. Provisional Patent Application having application No. 60/882,370 and filing date of 28 Dec. 2006, each application being hereby incorporated by reference herein.

BACKGROUND

1. Field of the Technology

The present disclosure relates generally to mobile stations operating in wireless communication networks, and more particularly to methods and apparatus for increasing data throughput by grouping data packets into maximum transmissible unit (MTU) sizes of data frames.

2. Description of the Related Art

A mobile communication device, such as a mobile station which operates in a wireless communication network, may provide for packet data communications. The mobile station may, for example, be compatible with $3^{rd}$ Generation (3G) communication standards (such as IS-2000 Release 0) and utilize Global System for Mobile Communications (GSM), Time Division Multiple Access (TDMA), Code Division Multiple Access (CDMA), General Packet Radio Service (GPRS), or Enhanced Data for GSM Evolution (EDGE) wireless network technologies. In such mobile stations, multiple user applications of the mobile station may include an Internet browser, an electronic mail (e-mail) application, a file transfer application, and other applications for which "best efforts" data transfer are desired.

Wireless data communication protocols, such as those of GPRS and its superset, EDGE, may allow for the efficient use of radio and network resources, particularly when data transmission characteristics are packet-based, intermittent, and non-periodic. Realistic data communications may be frequent with small transfers of data (e.g. less than 500 octets or bytes), or infrequent with large transfers of data (e.g. more than several hundred kilobytes). These radio protocols are sensitive to data payload size of the data packets, which may vary and be different from the maximum transmissible unit (MTU) size permitted by the logical link controller (LLC). Specifically, data payload throughput using GPRS or EDGE protocols increases as data payload size increases. However, it is generally desirable to maximize the data throughput of the system regardless of the data payload size of the data packets.

Accordingly, what are needed are methods and apparatus for increasing data throughput in such systems so as to overcome the deficiencies in the prior art.

BRIEF DESCRIPTION OF THE DRAWINGS

Embodiments of present disclosure will now be described by way of example with reference to attached figures, wherein:

FIG. 1 is a block diagram which illustrates pertinent components of a mobile station and a wireless communication network;

DETAILED DESCRIPTION OF THE PREFERRED EMBODIMENTS

Figure 2:
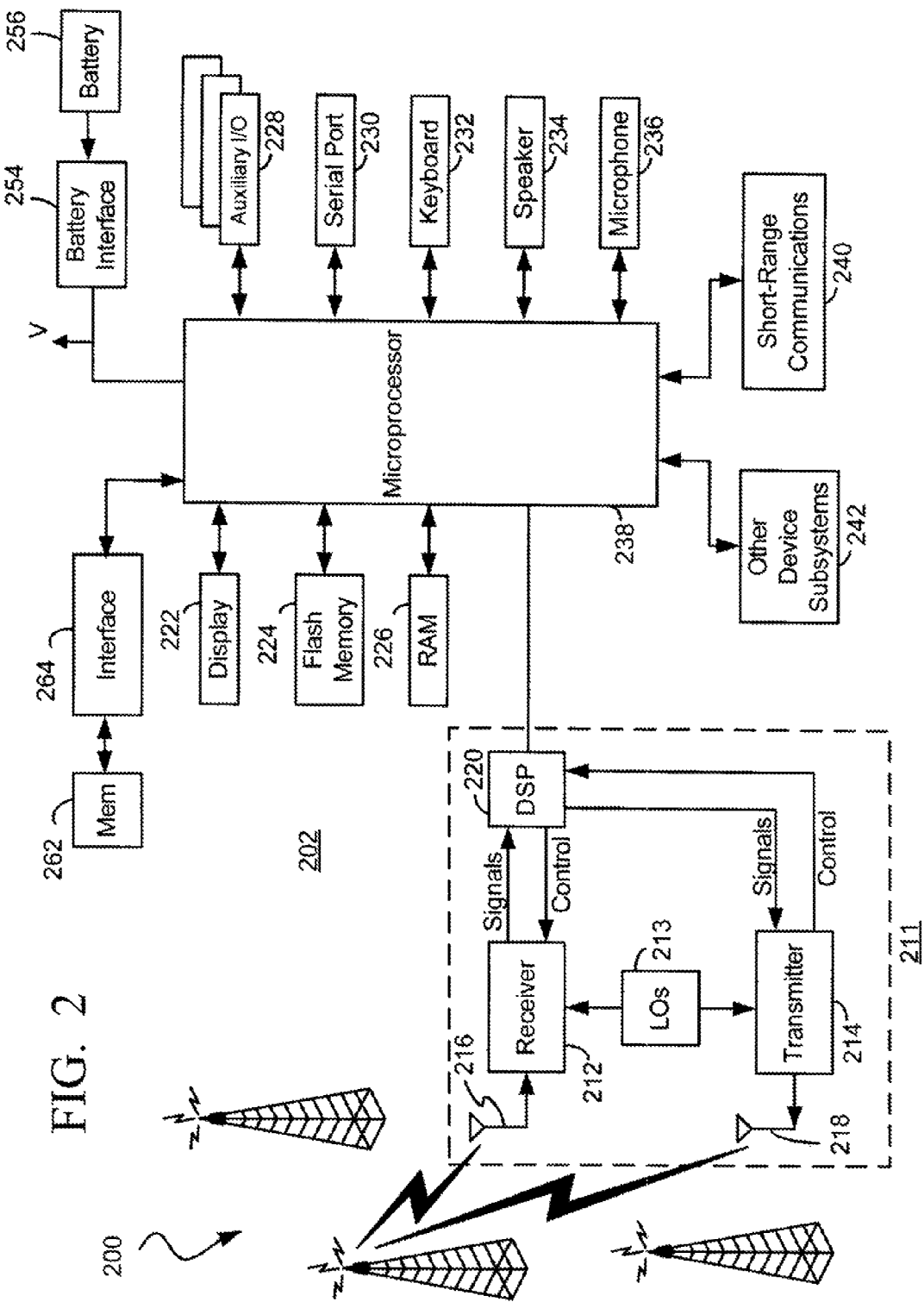
FIG. 2 is a more detailed diagram of a preferred mobile station of FIG. 1.

Methods and apparatus for increasing data throughput, by grouping data packets into maximum transmissible unit (MTU) sizes of data frames, are described herein. In an illustrative example, a mobile communication device has a wireless transceiver, an antenna circuit coupled to the wireless transceiver, and one or more processors, for use in communicating data in the wireless communication system. The one or more processors are operative to receive a plurality of data packets of varying payload size in a queue; associate one or more of the data packets from the queue into a group, such that a total size of the group is at or near a maximum transmissible unit (MTU) size of a data frame; cause the one or more data packets associated into the group to be formatted into the data frame for data transmission via the wireless transceiver; and repeat, for a plurality of data frames, the associating and causing, for communicating the data via the wireless transceiver. By associating the data packets into groups with the MTU size, data throughput of the data transmission in the wireless communication system is increased. Preferably, the one or more processors are further operative to rearrange an ordered sequence of the data packets from the queue to better achieve the MTU size for each data frame.

To illustrate the preferred embodiment, FIG. 1 shows a block diagram of a communication system 100 which includes a mobile station 102 (one type of wireless or mobile communication device) which communicates through a wireless communication network 104. Mobile station 102 preferably includes a visual display 112, a keyboard 114, and perhaps one or more auxiliary user interfaces (UI) 116, each of which are coupled to a controller 106. Controller 106 is also coupled to radio frequency (RF) transceiver circuitry 108 and an antenna 110. Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of station 118 and BSC 120, including for example modulation/demodulation and possibly encoding/decoding and encryption/decryption. It is also contemplated that RF transceiver circuitry 108 may perform certain functions in addition to those performed by BSC 120. It will be apparent to those skilled in art that RF transceiver circuitry 108 will be adapted to particular wireless network or networks in which mobile station 102 is intended to operate.

Mobile station 102 includes a battery interface 134 for receiving one or more rechargeable batteries 132. Battery 132 provides electrical power to electrical circuitry in mobile station 102, and battery interface 134 provides for a mechanical and electrical connection for battery 132. Battery interface 134 is coupled to a regulator 136 which regulates power to the device. When mobile station 102 is fully operational, an RF transmitter of RF transceiver circuitry 108 is typically keyed or turned on only when it is sending to network, and is otherwise turned off to conserve resources. Similarly, an RF receiver of RF transceiver circuitry 108 is typically periodically turned off to conserve power until it is needed to receive signals or information (if at all) during designated time periods.

Mobile station 102 operates using a Subscriber Identity Module (SIM) 140 which is connected to or inserted in mobile station 102 at a SIM interface 142. SIM 140 is one type of a conventional "smart card" used to identify an end user (or subscriber) of mobile station 102 and to personalize the device, among other things. Without SIM 140, the mobile station terminal is not fully operational for communication through wireless network 104. By inserting SIM 140 into mobile station 102, an end user can have access to any and all of his/her subscribed services. SIM 140 generally includes a processor and memory for storing information. Since SIM 140 is coupled to SIM interface 142, it is coupled to controller 106 through communication lines 144. In order to identify the subscriber, SIM 140 contains some user parameters such as an International Mobile Subscriber Identity (IMSI). An advantage of using SIM 140 is that end users are not necessarily bound by any single physical mobile station. SIM 140 may store additional user information for the mobile station as well, including datebook (or calendar) information and recent call information.

Mobile station 102 may consist of a single unit, such as a data communication device, a (handheld) cellular telephone, a multiple-function communication device with data and voice communication capabilities, a personal digital assistant (PDA) enabled for wireless communication, or a computer incorporating an internal modem. Mobile station 102 may be a small portable handheld mobile device which includes a housing made of plastic or other suitable material, which contains and/or carries the electrical components and user interface components. Alternatively, mobile station 102 may be a multiple-module unit comprising a plurality of separate components, including but not limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. Wireless communication network 104 may be a cellular telecommunications network. In the embodiment of FIG. 1, wireless network 104 is configured in accordance with General Packet Radio Service (GPRS) and a Global Systems for Mobile (GSM) technologies. Preferably, wireless network 104 is configured in accordance with GPRS and Enhanced Data for GSM Evolution (EDGE) technologies. Wireless network 104 includes a base station controller (BSC) 120 with an associated tower station 118, a Mobile Switching Center (MSC) 122, a Home Location Register (HLR) 132, a Serving General Packet Radio Service (GPRS) Support Node (SGSN) 126, and a Gateway GPRS Support Node (GGSN) 128. MSC 122 is coupled to BSC 120 and to a landline network, such as a Public Switched Telephone Network (PSTN) 124. SGSN 126 is coupled to BSC 120 and to GGSN 128, which is in turn coupled to a public or private data network 130 (such as the Internet). HLR 132 is coupled to MSC 122, SGSN 126, and GGSN 128.

Station 118 may be a fixed transceiver station, and station 118 and BSC 120 may be referred to as transceiver equipment. The transceiver equipment provides wireless network coverage for a particular coverage area commonly referred to as a "cell". The transceiver equipment transmits communication signals to and receives communication signals from mobile stations within its cell via station 118. The transceiver equipment normally performs such functions as modulation and possibly encoding and/or encryption of signals to be transmitted to the mobile station in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells, each served by a station 118 (i.e. or station sector), depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in HLR 132. In case of a voice call to mobile station 102, HLR 132 is queried to determine the current location of mobile station 102. A Visitor Location Register (VLR) of MSC 122 is responsible for a group of location areas and stores the data of those mobile stations that are currently in its area of responsibility. This includes parts of the permanent mobile station data that have been transmitted from HLR 132 to the VLR for faster access. However, the VLR of MSC 122 may also assign and store local data, such as temporary identifications. Optionally, the VLR of MSC 122 can be enhanced for more efficient co-ordination of GPRS and non-GPRS services and functionality (e.g. paging for circuit-switched calls which can be performed more efficiently via SGSN 126, and combined GPRS and non-GPRS location updates).

Serving GPRS Support Node (SGSN) 126 is at the same hierarchical level as MSC 122 and keeps track of the individual locations of mobile stations. SGSN 126 also performs security functions and access control. Gateway GPRS Support Node (GGSN) 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile station 102 or by the transceiver equipment instructing mobile station 102 to select a particular cell. Mobile station 102 informs wireless network 104 when it reselects another cell or group of cells, known as a routing area.

In order to access GPRS services, mobile station 102 first makes its presence known to wireless network 104 by performing what is known as a GPRS "attach". This operation establishes a logical link between mobile station 102 and SGSN 126 and makes mobile station 102 available to receive, for example, pages via SGSN, notifications of incoming GPRS data, or SMS messages over GPRS. In order to send and receive GPRS data, mobile station 102 assists in activating the packet data address that it wants to use. This operation makes mobile station 102 known to GGSN 128; interworking with external data networks can thereafter commence. User data may be transferred transparently between mobile station 102 and the external data networks using, for example, encapsulation and tunneling. Data packets are equipped with GPRS-specific protocol information and transferred between mobile station 102 and GGSN 128.

Those skilled in art will appreciate that a wireless network may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviors at the wireless link.

FIG. 2 is a detailed block diagram of a preferred mobile station 202 of the present disclosure. Mobile station 202 is preferably a two-way communication device having at least voice and advanced data communication capabilities, including the capability to communicate with other computer systems. Again, mobile station 202 may be a small portable handheld mobile device which includes a housing made of plastic or other suitable material, which contains and/or carries electrical components and user interface components. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of fixed transceiver stations 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the wireless communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a Subscriber Identity Module or "SIM" card 262 to be inserted in a SIM interface 264 in order to operate in the network. SIM 262 includes those features described in relation to FIG. 1. Mobile station 202 is a battery-powered device so it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown) which provides a regulated voltage V to all of the circuitry.

Mobile station 202 includes a microprocessor 238 (which is one implementation of controller 106 of FIG. 1) which controls overall operation of mobile station 202. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a wireless communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, as well as the data communication techniques of the present disclosure, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a wireless communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

Figure 3:
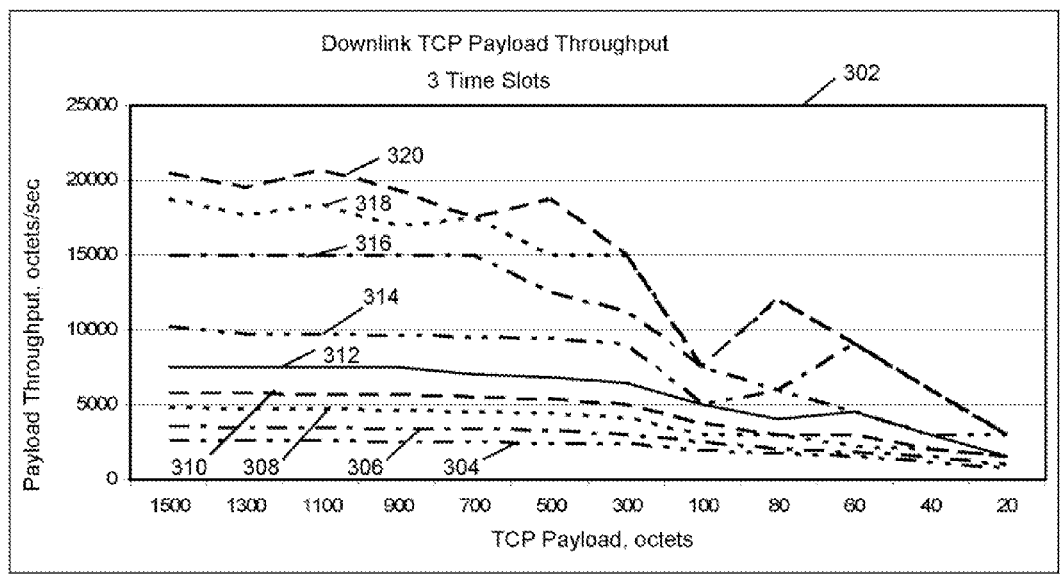
FIG. 3 is a graph of curves of downlink payload data throughput versus data payload size for an exemplary wireless communication network, namely, an Enhanced Data Rate for Global Systems for Mobile Communications (GSM) Evolution (EDGE) network.

FIG. 3 is a graph 302 of curves representing downlink payload data throughput as a function of data payload size over three time slots for packet-based transmission in an EDGE-compatible wireless network. GPRS and EDGE data packet-based networks operate in accordance with an adaptive modulation and coding scheme (MCS). In EDGE, data transfer rates vary depending on the redundancy of the channel coding utilized, which is dependent on fading radio channel characteristics with respect to bit error rate (BER). Higher data rates may be utilized as radio frequency (RF) carrier-to-interference (C/I) level increases.

Each curve in graph 302 represents a different level of MCS data throughput variations dependent on data payload size. Nine MCS levels are defined for EDGE networks, namely, MCS-1 through MCS-9. MCS-1 is represented by curve 304; MCS-2 is represented by curve 306; MCS-3 is represented by curve 308; MCS-4 is represented by curve 310; MCS-5 is represented by curve 312; MCS-6 is represented by curve 314; MCS-7 is represented by curve 316; MCS-8 is represented by curve 318; and MCS-9 is represented by curve 320 of FIG. 3. MCS-1 represents lowest data throughput of the nine MCS, and may be utilized in low RF signal C/I level conditions and/or while sufficient redundant channel coding conditions are preferred. On the other hand, MCS-9 represents the greatest data throughput of the nine MCS and is utilized in strong RF C/I level conditions and/or while minimal redundant channel coding conditions are preferred. Such packet-based data transmissions incorporate correction methods within a transmission frame to increase probability of successful data communications. Correction methods in weak RF conditions require sufficient redundancy in transmission of data packets, which inherently reduces data throughput. Correction methods are more extensive for MCS-1 data transmissions than for MCS-9 data transmissions.

As apparent from chart 302, data payload throughput decreases as data payload size decreases. Correspondingly, it has been observed that data payload throughput increases as data payload size increases at or near the MTU size of the data frame. This is partly due to a fixed header size for each data packet transmission.

Figure 4A:
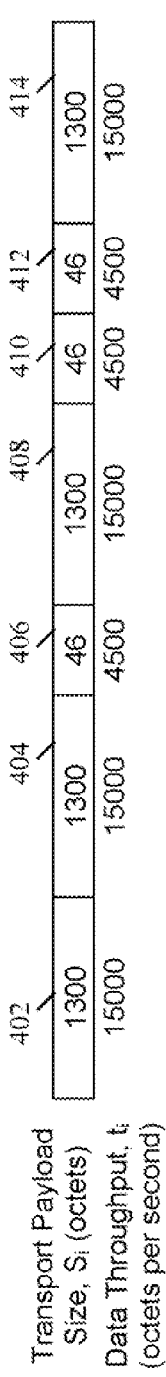
FIG. 4A is an illustration of a plurality of data packets of various payload size to be provided in transport data frames according to conventional techniques.

FIG. 4A is an illustration of a plurality of transport data packets 402, 404, 406, 408, 410, 412, and 414 of various transport payload size received sequentially in a data queue for data transmission according to conventional techniques. The numerical value listed in each data packet represents a data payload size. Data throughput values shown in the example of FIG. 4A are representative of MCS-7 data throughput according to curve 316 of FIG. 3. Transport data payload size values are listed in octets, and data throughput values are listed in octets per second. A corresponding data throughput value for each data frame payload size value is listed directly below each data frame payload size.

As illustrated, data packets 402, 404, 408, and 414 having a transport data payload size equal to 1300 octets are transmitted with a data throughput of 15000 octets/second. On the other hand, data packets 406, 410, and 412 having a transport data payload size of 46 octets are transmitted with a data throughput of 4500 octets/second. As apparent, when the transport data payload size varies per transport data frame during operations, the average data throughput is reduced. This is a result of system inefficiency in handling small control packets.

Equation 1 below may be used to compute a weighted average of data throughput for the transmission of N data packets. The transport data payload sizes and corresponding data throughput values from the description of FIG. 4A may be applied to Equation 1 to provide a weighted average data throughput value.

$$\bar{T} = \sum_{i=1}^{N} t_i \left( \frac{S_i}{\sum_{i=1}^{N} S_i} \right) = 14{,}550 \text{ octets/second} \quad \text{Equation 1}$$

where $\bar{T}$=Average data throughput (octets/second),

N=Number of data packets in sequence, $t_i$=Instantaneous data throughput for data packet "i" (octets/second), and $S_i$=Transport payload size of data packet "i" (octets).

Based on equation 1 above, transmission of the data packets in FIG. 4A reduce the data throughput by 3% compared to the data throughput of 15000 octets/second for transmission of data packets of sizes at or near a maximum transmissible unit (MTU) size. In EDGE-compatible wireless networks, the MTU is defined as 1500 octets. According to curve 316 of FIG. 3, data packets of data payload size equal to 700 octets or more are transmitted with a data throughput of 15000 octets/second. Transmission of data packets of payload size less than 700 octets may decrease the average data throughput.

Figure 4B:
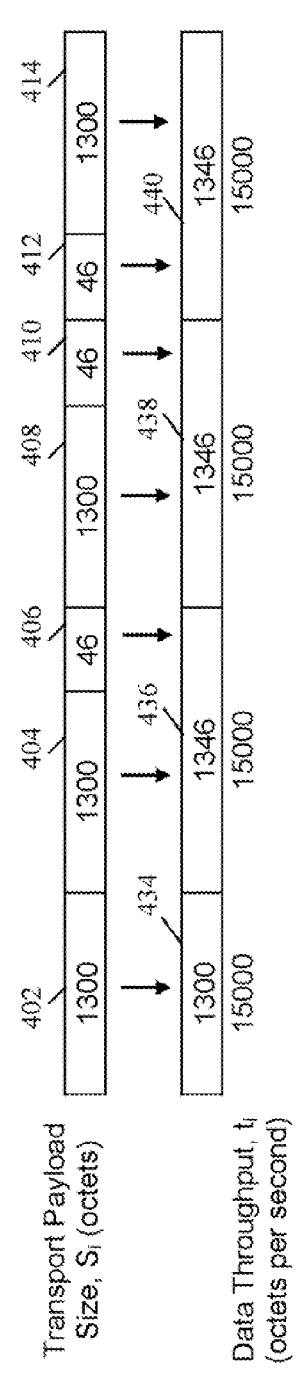
FIG. 4B is an illustration of the plurality of data packets of various payload size of FIG. 4A, for grouping into transport data frames at or near the maximum transmissible unit (MTU) size according to the present disclosure.

FIG. 4B is an illustration of the plurality of transport data packets 402, 404, 406, 408, 410, 412, and 414 of FIG. 4A, which are grouped into transport data frames at or near a maximum transmissible unit (MTU) size according to the present disclosure. In the example shown in FIG. 4B, data packets 402, 404, 406, 408, 410, 412, and 414, represent data packets stored in a memory or data queue. The data queue may exist within a communication device such as in RAM 226 of FIG. 2, memory of DSP 220 or microprocessor 238 of FIG. 2, flash memory 224 of FIG. 2, or some other form of memory. Techniques of the present disclosure including combining or grouping data packets from the data queue (e.g. adjacent or consecutive data packets received sequentially in the data queue from left to right) into groups of data having a size that is at or near the MTU size and inserting them into a data frame for data transmission. In the example of FIG. 4B, the result which is shown is a data group 434 having data packet 402 for a data frame, a data group 436 having data packets 404 and 406 for a data frame, a data group 438 having data packets 408 and 410 for a data frame, and a data group 440 of data packets 412 and 414 for a data frame. Thus, each data frame in FIG. 4B has a sufficient number of data packets with a combined total size that is at or near the MTU size. The four groups of data packets 434, 436, 438 and 440 are of data payload size 1300-1346 octets and transmitted at a data throughput of 15000 octets/second. Calculating based on Equation 1 above, the result is a weighted average data throughput of 15000 octets/second. As previously illustrated in the example of FIG. 4A, conventional methods of transmitting data packets within transport data frames provide a weighted average data throughput of 14550 octets/second.

Figure 4C:
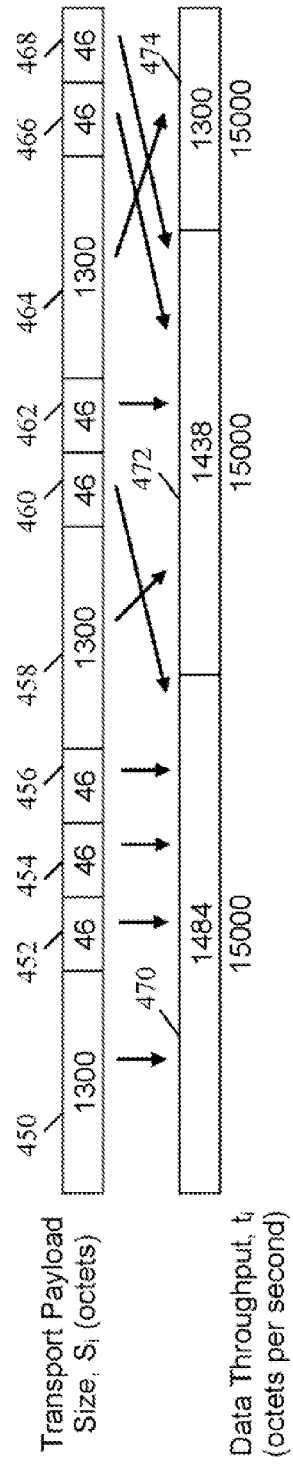
FIG. 4C is an illustration of a plurality of transport data packets of various payload size for reordering and grouping into transport data frames at or near the MTU size according to the present disclosure.

FIG. 4C is an illustration of a plurality of transport data packets 450, 452, 454, 456, 458, 460, 462, 464, 466, and 468 received sequentially in the data queue from left to right, which are subsequently reordered and grouped into transport data frames at or near the MTU size for data transmission according to further techniques of the present disclosure. Reordering of data packets is performed such that the MTU size for each data frame is better achieved. As with the example of FIG. 4B, the example shown in FIG. 4C has data packets 402, 404, 406, 408, 410, 412, and 414 which are stored in the data queue. Again, the data queue may exist within a communication device such as in RAM 226 of FIG. 2, memory of DSP 220 or microprocessor 238 of FIG. 2, flash memory 224 of FIG. 2, or some other form of memory. The further techniques of the present disclosure include both reordering and combining data packets from the data queue into groups of data having a size that is at or near the MTU size. In the example of FIG. 4C, the result which is shown is a data group 470 having data packets 450, 452, 454, 456 and 460 for a data frame, a data group 472 having data packets 458, 462, 466, and 468 for a data frame, and a data group 474 having data packet 464 for a data frame. Thus, each data frame in FIG. 4C has a sufficient number of data packets with a combined total size that is at or near the MTU size.

As stated previously, the reordering of the data packets is performed so that the MTU size for each data frame is better achieved or realized. When a data frame is not completely filled to the MTU size, and the next data packet(s) in the data queue considered would (if grouped into the data frame) cause the total size of the data frame to exceed the MTU or the defined size of the data frame, that next data packet(s) is ignored and one or more smaller data packets which follow the ignored data packet(s) is selected for grouping into the data frame. The ignored data packet(s) is left for grouping into the next data frame for transmission. This technique is performed continually for all data packets in the data queue and data frames.

In FIG. 4C, the four groups of data packets 434, 436, 438 and 440 are of data payload size around 1300-1484 octets which are transmitted at a data throughput of 15000 octets/second. Calculating based on Equation 1 above, the result is a weighted average data throughput of 15000 octets/second. Using the conventional technique illustrated in the example of FIG. 4A, conventional methods of transmitting the data packets of FIG. 4C would provide a weighted average data throughput of 14220 octets/second. Thus, when data packets are reordered and combined into larger groups of data in FIG. 4C, an improvement in transmission efficiency of better than 5% may be achieved.

Figure 5:
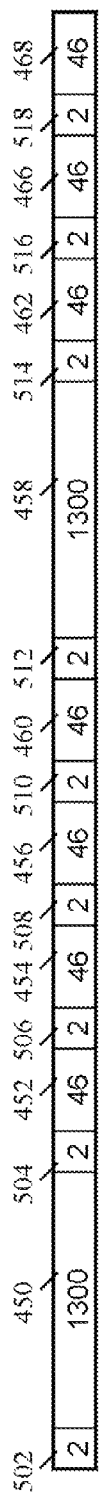
FIG. 5 is an illustration of a plurality of transport data frames, each having an MTU-sized grouping of one or more data packets and subheaders according to the present disclosure.

FIG. 5 is an illustration of a plurality of data frames which are provided with subheaders for each data packet to help better achieve the grouping/ungrouping and ordering/reordering techniques of the present disclosure. When data packets are reordered and grouped according to the example described in relation to FIG. 4C above, a subheader may be associated with each data packet to identify the data packet size and original location or sequence number of the data packet. The subheader may require only a relatively small number of octets. In one example, the subheader may have two octets with eleven bits pertaining to data packet size and five bits pertaining to the original location or sequence number of the data packet. The original location of the data packet indicates the relative position or sequence number of the data packet prior to the reordering. The subheader size may be defined based on a maximum data packet size or "ceiling" expected within the data stream. For example, eleven (11) bits assigned to a data packet size portion of the subheader allows for a maximum data packet size corresponding to 2048 octet-sized data packet. Five bits assigned to an original location portion of the subheader allows for a maximum number corresponding to 32 data packets within a group.

Regarding the details in FIG. 5, what are shown are two data groups 470 and 472 of FIG. 4C for two data frames, respectively, where a subheader is provided for each data packet. For example, data packet 450 is part of data group 470, and subheader 502 associated with data packet 450 is located immediately preceding data packet 450. Subheader 502 may contain information pertaining to size and original location of data packet 470, as described earlier above. Similarly, subheader 504 precedes and is associated with data packet 452; subheader 506 precedes and is associated with data packet 454; subheader 508 precedes and is associated with data packet 456; subheader 510 precedes and is associated with data packet 460; subheader 512 precedes and is associated with data packet 458; subheader 514 precedes and is associated with data packet 462; subheader 516 precedes and is associated with data packet 466; and, subheader 518 precedes and is associated with data packet 468. As suggested earlier, subheader size may vary depending on application and design choice. Note that, in a variation of that shown in FIG. 5, all of the subheaders of a data frame may be grouped together contiguously at the beginning of the data frame in contrast to being interspersed between the data packets.

Figure 6:
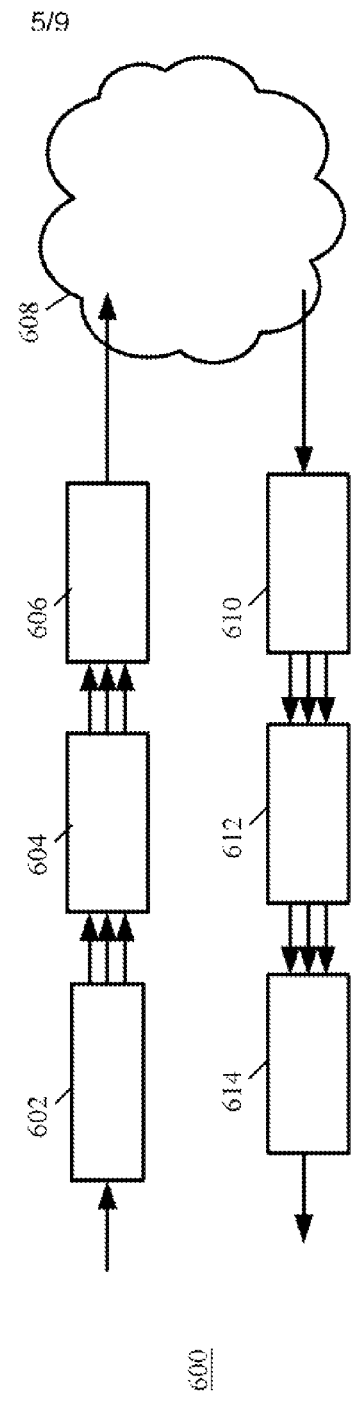
FIG. 6 is a block diagram showing functional blocks for reordering and grouping data packets into transport data frames at or near the MTU size for data transmission, to a compatible receiver for ungrouping and restoring the original order such data packets.

FIG. 6 is a block diagram showing functional blocks for reordering, grouping and packing data packets within a transport data frame for efficient transmission to a compatible receiver for unpacking, ungrouping and restoring the original order of the data packets. The functional blocks shown in FIG. 6 may represent a process or group of processes stored within memory of a wireless communication device. Depending on the application, the reordering and restoring functional blocks may be optional. One or more processors (e.g. DSP and/or microprocessors) and/or associated circuitry may be operative to process functions defined within the functional blocks. On the transmitting side (e.g. a transmitting communication device), the functional blocks of FIG. 6 include a data queue 602, a data packet grouper 604, and a data frame generator 606. On the receiving side (e.g. a receiving communication device), the functional blocks include a data frame unpacker 610, a data packet ungrouper 612, and a reordering unit 614. In combination with the block diagram of FIG. 6, reference may be made to the visual illustrations of the mobile station in FIGS. 1-2 as well as the illustrations of the data packets in FIGS. 4-5.

An input to data queue 602 is coupled to and receives a plurality of N sequentially-ordered data packets, which may be from an output of a process within DSP 220 and/or microprocessor 238. Data queue 602 may comprise memory locations within the DSP or microprocessor, RAM, or external memory in the wireless communication device. One example of a plurality of N sequentially-ordered data packets is shown in FIG. 4C, where N is equivalent to ten (10) for data packets 450-468 in FIG. 4C. One or more outputs from data queue 602 are coupled to one or more inputs to data packet grouper 604. The output(s) from data queue 602 provides data packets to the input(s) to data packet grouper 604. Functions of data packet grouper 604 include reordering and grouping one or more of the data packets into optimally-packed groups of M data packets. Optimally-packed groups of M data packets are a subset of the plurality of N sequentially-ordered data packets in data queue 602. One or more outputs from data packet grouper 604 are coupled to one or more inputs to data frame generator 606. Functions of data frame generator 606 include formatting each optimally-packed group of M data packets into a transport data frame. Preferably, the optimally-packed groups of M data packets are of size that is at or near a maximum transmissible unit (MTU) size of the transport data frame as defined by a wireless communication system 608. The MTU size may be the maximum size allowed or permitted by a logical link controller (LLC) of the wireless device or system. Referring back to FIG. 4C, three examples of optimally-packed data groups 470, 472, and 474 are shown. Data group 470 has M=5, data group 472 has M=4, and data group 474 has M=1.

Preferably, such techniques are based on nonlinear constraint optimization for grouping the data packets. An example equation using nonlinear constraint optimization is shown below in Equation 2.

$$\text{MAX } S = \sum_{i=1}^{M} \sum_{j=1}^{N} x_{ij} s_{ij}, \; x_{ij} \in \{0, 1\}$$

$$\text{S.T. } \sum_{i=1}^{M} x_{ij} s_{ij} \leq L_{MTU}, \; \forall \, j \in \{1 \, \ldots \, N\}$$

where
S=size of the data frame (in octets);
s=size of a candidate data packet (in octets);
x=Boolean weight of whether or not the candidate data packet can be inserted into the data frame, where x={0, 1}; and
$L_{MTU}$=length of a destination data packet (in octets).
Additional operational functions performed within each functional block of FIG. 6 are described later in description of flowcharts of FIGS. 7-10. Alternatively, other sorting and grouping techniques may provide data group size at or near the MTU size. An output of data frame generator 606 provides the transport data frames with optimally-packed groups of M data packets having sizes that are at or near the MTU size. Such transport data frames are transmitted and carried over radio frequency (RF) signals, through RF modulation, to and through wireless system 608.

Wireless system 608 provides such RF signals having the transport data frames to the receiving end (e.g. the recipient communication device). The RF signals are demodulated and the transport data frames are provided to an input of data frame unpacker 610. Again, each transport data frame unpacked by data frame unpacker 610 includes optimally-packed groups of M data packets having a size that is at or near the MTU size. Functions of data frame unpacker 610 include extracting or unpacking contents of the transport data frame, to thereby obtain the optimally-packed group of M data packets. One or more outputs of data frame unpacker 610 are coupled to one or more inputs of data packet ungrouper 612. The one or more outputs of data frame unpacker 610 provide an optimally-packed group of M data packets to the one or more inputs of data packet ungrouper 612. Functions of data packet ungrouper 612 include identifying and selecting each data packet from within the optimally-packed group of M data packets to ungroup each data packet from the data group. One technique for identifying and selecting each data packet makes use of a subheader associated with each data packet. The subheader associated with each data packet may include information describing data packet size and relative location in the original sequence of data packets. For example, see the previous description in relation to FIG. 5.

One or more outputs of data packet ungrouper 612 are coupled to one or more inputs of re-ordering unit 614. The one or more outputs of data packet ungrouper 612 provide the unpacked and ungrouped M data packets to the one or more inputs of re-ordering unit 614 for each transport data frame. These data packets are not in the order as originally provided in data queue 602 of the transmitting end, but are rather reordered as provided by data packet grouper 604 in the transmitting end. Thus, functions of re-ordering unit 614 include restoring the original order of the data packets from the transport data frames into the original N sequentially-ordered data packets. Again, one technique for identifying the original location of each data packet makes use of the subheader associated with each data packet. The subheader associated with each data packet may include information describing data packet size and location in the original sequence of data packets, as described earlier in relation to FIG. 5. Thus, an output of re-ordering unit 614 provides the original N sequentially-ordered data packets. The plurality of N sequentially-ordered data packets may be coupled to conventional circuitry or processes for processing using conventional methods in the communication device.

Figure 7:
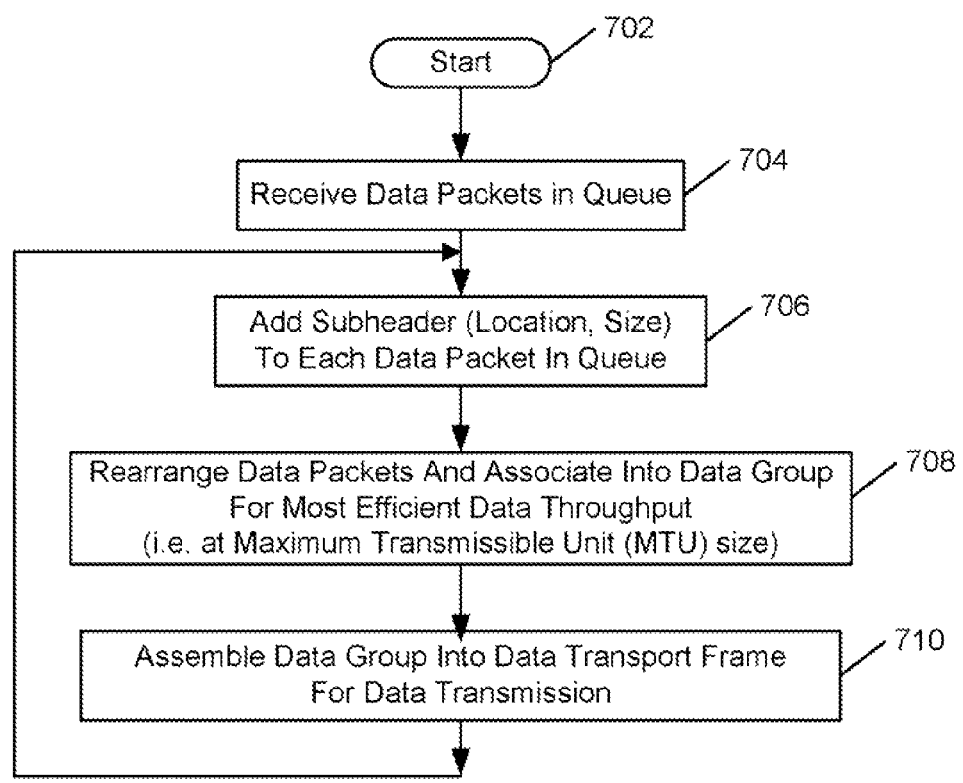
FIG. 7 is a flowchart of a procedure for reordering and grouping data packets of various sizes into transport data frames at or near the MTU size for transmission.

FIG. 7 is a flowchart of a procedure for reordering and grouping data packets of various sizes into data frames, such that each data frame has a size that is at or near a maximum transmissible unit (MTU) size, for data transmission via a wireless communication network. The method may be performed by a wireless communication device, and/or be embodied in a computer program product which includes a storage medium (e.g. memory) and computer instructions stored in the storage medium which are executable by one or more processors. In combination with the flowchart of FIG. 7, reference may be made to the illustrations of the mobile station in FIGS. 1-2, the illustrations of data packets in FIGS. 4-5, and the functional block diagram in FIG. 6.

Beginning at a start block 702 of FIG. 7, a plurality of data packets are received at the input of data queue 602 of FIG. 6 (step 704 of FIG. 7). The data packets stored in data queue 602 may be of varying payload size. For each data packet, data packet grouper 604 of FIG. 6 produces and associates a subheader with each data packet for indicating a data packet size and relative location or sequence number within the data packet sequence (step 706 of FIG. 7). The subheader may have a size of one or more octets depending on the coding format, the data packet size, and the quantity of data packets permitted within a group of data packets.

Example subheaders may be those subheaders 502-518 described previously in relation to FIG. 5, which may occupy two octets (sixteen bits). Within a subheader of size two octets, eleven (11) bits may be allocated for defining a data packet size and five (5) bits may be allocated for defining a data packet location or sequence number within the original data packet sequence. In this example subheader, the eleven (11) bits allocated for defining the data packet size may accommodate a data packet size of up to 2048 ($2^{11}$) octets. The five (5) bits allocated for defining the data packet location in the original data packet sequence may accommodate up to 32 ($2^5$) data packets. As apparent, depending on the application and use, the subheader size may vary. In addition, the example subheader described includes an allocation of bits within the subheader for defining the relative location or sequence number of the data packets within the original data packet sequence. In cases where data packets are not reordered as part of the grouping procedure, however, the subheader may not include bits allocated for the relative location or sequence number.

For each data frame, data packet grouper 604 of FIG. 6 associates data packets from data queue 602 into a group having a total size that is at or near a maximum transmissible unit (MTU) size of the data frame (step 708 of FIG. 7). Again, in the present embodiment, the MTU size may be the maximum size allowed or permitted by a logical link controller (LLC) of the wireless device or system. To perform this function, for example, data packet grouper 604 may initially associate a first (or next available) data packet from data queue 602 into a current group for a current data frame. As apparent, each grouping or data frame will include at least one data packet. Data packet grouper 604 then identifies whether a size of the next current candidate data packet from data queue 602 is less than or equal to an available remaining size in the current group, so that the total size of the current group does not exceed the MTU size. If so, the current candidate data packet is also associated into the current data frame for the current group. Otherwise, if the size of the current candidate data packet from data queue 602 is greater than the available remaining size in the current group, data packet grouper 604 refrains from associating the current candidate data packet into the current group. In this latter case, the current group or data frame may be considered to be completed or fully packed, and the current candidate data packet may be associated in the next group or data frame.

Reordering of the data packets from the original order in data queue 602 is optional and may depend on the application. As described previously, the reordering of the data packets is performed so that the MTU size for each data frame is better achieved or realized. That is, when a data frame is not completely filled to the MTU size, and the next data packet(s) in data queue 602 considered would (if grouped into the data frame) cause the total size of the data frame to exceed the MTU size or the defined size of the data frame, that next data packet(s) is skipped over and one or more smaller data packets which follow the skipped data packet(s) is selected for grouping into the data frame. The skipped data packet(s) is left for grouping into the next data frame for transmission. This technique is performed continually for all data packets in the data queue and data frames.

Once data packets are associated into a group of size at or near the MTU size in step 708, data frame generator 606 of FIG. 6 generates a transport data frame which includes the group of data packets (step 710 of FIG. 7). The transport data frames may be formatted in accordance with a transport layer for communications. Transport data frames have headers (e.g. generally of size forty-four (44) octets for EDGE applications) to define protocol and other pertinent information. Such headers and other information within the transport data frames are well-documented in standards specifications. The process shown in the flowchart of FIG. 7 is shown as terminating at an end block 712 of FIG. 7, but these steps are repeated continuously for each transport data frame.

Figure 8:
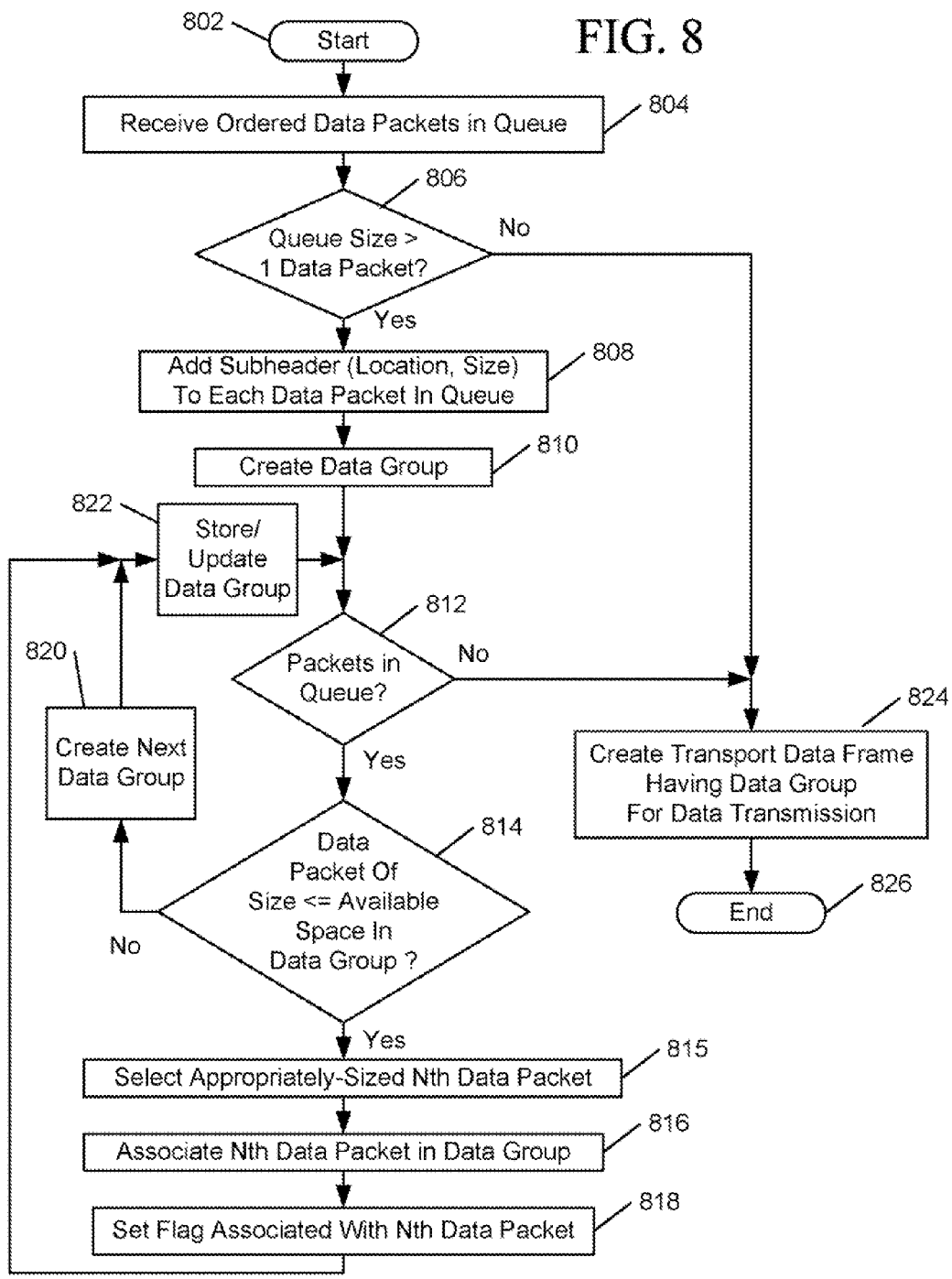
FIG. 8 is a more detailed flowchart of the procedure of FIG. 7 for reordering and grouping data packets of various sizes into transport data frames at or near the MTU size.

FIG. 8 is a more detailed flowchart of the procedure shown in the flowchart of FIG. 7 for grouping (with optional reordering of) data packets of various sizes into data frames of a size that is at or near an MTU size for data transmission. The method may be performed by a wireless communication device, and/or be embodied in a computer program product which includes a storage medium (e.g. memory) and computer instructions stored in the storage medium which are executable by one or more processors. In combination with the flowchart of FIG. 8, reference will be made to the illustrations of the mobile station in FIGS. 1-2, the illustrations of data packets in FIGS. 4-5, and the functional block diagram in FIG. 6.

Beginning at a start block 802 of FIG. 8, data packets of various size are received in data queue 602 of FIG. 6 (step 804 of FIG. 8). If two or more data packets are stored in the data queue (as tested in step 806 of FIG. 8), data packet grouper 604 of FIG. 6 produces and associates a subheader for the next data packet in data queue 602 (step 808 of FIG. 8). One exemplary subheader was described previously in relation to step 706 of FIG. 7. Next, data packet grouper 604 initializes a data group for the purpose of grouping data packets from data queue 602 (step 810 of FIG. 8). Data packet grouper 604 then initiates an iterative loop process for reordering and grouping data packets into a data group having a size that is at or near to an MTU size for insertion within a data frame. The iterative loop process is described in steps 812-822 and may end once all data packets within data queue 602 are associated into data groups.

In the iterative loop process, if any data packets are stored in the data queue (as tested in step 812 of FIG. 8), data packet grouper 604 determines if any of the data packets remaining within data queue 602 are of appropriate size to be placed into the data group (step 814 of FIG. 8). A search within data queue 602 may be performed to locate an appropriately-sized packet. A test within such search may include identifying a size of a data packet available in data queue 602 that is equal to or smaller than the remaining available space within the data group. The available space within the data group may be determined by subtracting a sum of data packet sizes currently associated within the data group (including overhead associated therewith) from the MTU size. If any data packets within the data queue are determined to be of a size that is less than or equal to the available space remaining within the data group, data packet grouper 604 selects that data packet (step 815 of FIG. 8) and associates it into the data group (step 816 of FIG. 8). Once the selected data packet is placed into the data group in step 816, data packet grouper 604 sets a flag or bit associated with the selected data packet to indicate that the data packet is now unavailable for future grouping (step 818 of FIG. 8). After the data packet has been chosen for insertion into a data group, data packet grouper 604 stores the data group in a memory location (step 822 of FIG. 8) and the process returns to step 812. Steps 812 through 822 may repeat a number of times so that a plurality of data packets are associated within the data group, until there is no available space remaining in the current data group and the data group has a size that is at or near the MTU size. When there is no remaining space in the current data group (i.e. the MTU size has been achieved) as identified in step 814, data packet grouper 604 creates the next data group for combining additional data packets (step 820 of FIG. 8). Once data queue 602 is empty in step 812, data frame generator 606 of FIG. 6 creates the transport data frame(s) which includes the data group(s) for data transmission (step 824 of FIG. 8). As all data packets within data queue 602 have been processed into data transport frames, the process may be terminated at an end block 826 of FIG. 8.

There are a few different ways to determine whether the data group has reached a size that is at or near the MTU size, for use in step 708 of FIG. 7 or step 814 of FIG. 8, for example. One way is to test whether the data group has a size that exactly matches the MTU size. However, reaching the exact MTU size in the data group would not necessarily be a common occurrence in actual practice. Another way is to determine a threshold in advance based on the MTU size and resulting data throughput efficiency, at which the data group may be deemed efficiently or optimally packed. For example, the threshold may be 80% of the MTU size. Here, if the total size of the data group is at or above 80% of the MTU size, then the data group may be deemed efficiently or optimally packed so to as to be assembled into a transport data frame, and the next data group may be created. Preferably, the threshold is set based on empirical data for maximizing data throughput in the wireless system. For example, see the graph 302 of FIG. 3. With such data, the threshold may be set anywhere between 50%-90%. Yet another way to attempt to achieve the MTU size in the data group is to perform data grouping in a more realistic "best effort" manner given the sizes of the actual data packets in the data queue, more closely to that what is described in relation to step 814 of FIG. 8. Such approaches may be used alone or in combination.

Figure 9:
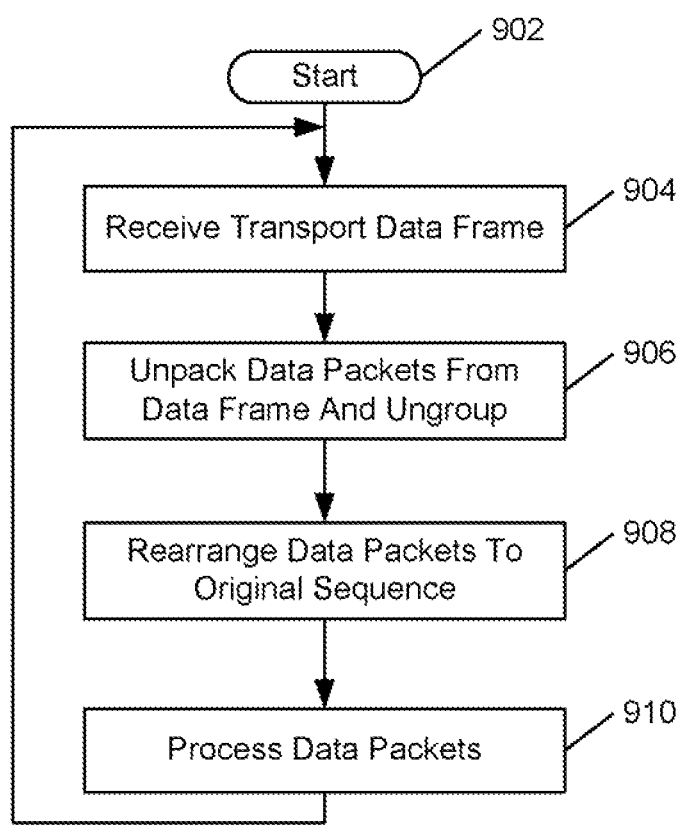
FIG. 9 is a flowchart of a procedure for unpacking and restoring the original order of the data packets from the transport data frame.

FIG. 9 is a flowchart of a procedure for unpacking and reordering data packets within an MTU-sized transport data frame from the wireless network. The method may be performed by a wireless communication device, and/or be embodied in a computer program product which includes a storage medium (e.g. memory) and computer instructions stored in the storage medium which are executable by one or more processors. In combination with the flowchart of FIG. 9, reference may be made to the illustrations of the mobile station in FIGS. 1-2, the illustrations of data packets in FIGS. 4-5, and the functional block diagram in FIG. 6. The process described in the flowchart of FIG. 9 may be utilized for receiving the transport data frames containing the reordered and grouped data packets produced by the techniques of FIGS. 7 and 8.

Beginning at start block 902 of FIG. 9, data frame unpacker 610 of FIG. 6 receives a transport data frame via the wireless system 608 (step 904 of FIG. 9). Once a data transport frame is received in step 904, data frame unpacker 610 unpacks a group of M data packets from the transport data frame (step 906 of FIG. 9). Unpacking the group of data packets from the transport data frame includes removing header information associated with the transport data frame. Data packet ungrouper 612 of FIG. 6 then causes the group of data packets to be ungrouped (also step 906 of FIG. 9). Ungrouping the data packets includes identifying and reading each data packet using the data packet size(s) associated with the subheader(s). In particular, the beginning of the data packet to be read may be determined based on the subheader sizes and the data packet sizes for those data packets that have been unpacked from the data frame; the amount of data in the data packet to be read is equivalent to the data packet size corresponding to the data packet.

Re-ordering unit 614 of FIG. 6 rearranges the data packets to restore the order of the original sequence (step 908 of FIG. 9). Preferably, this function is performed with use of the relative location or sequence number in the subheaders for each data packet. Specifically, the data packets are reordered in accordance with a proper numerical order of the sequence numbers from the subheaders. Note that, each group of M data packets may be a subset of the original sequentially-ordered N data packets described in relation to the flowchart of FIGS. 7 and 8, where two or more transport data frames are utilized for transmitting the original group of N data packets. Thus, the rearranging of data packets into the ordered sequence may utilize a memory buffer or accumulator to accumulate an appropriate number of data packets prior to the rearranging. The memory buffer or accumulator may be coupled to the output of data frame unpacker 610 and/or be a part of data packet ungrouper 612 of FIG. 6. Note that steps 906 and 908 may be performed together and/or within a single process. The original sequence of N data packets may then be processed accordingly based on conventional processes (step 910 of FIG. 9). Processing the N data packets may include one or more applications such as email, text messaging, streaming video, or software program upgrades or downloads.

Receiving data transport frames, unpacking the data transport frames to extract the optimally grouped data packets, rearranging the order of the data packets to their original sequence, and processing the data packets may be a continual, ongoing process. Thus, as data packets are further processed in step 910 of FIG. 9, the method returns to step 904 to repeat the process. Alternatively, the process may be terminated following the action in step 910. In the event that the present method is terminated following the action in step 910, the process may be re-initiated when a next transport data frame is received.

Figure 10:
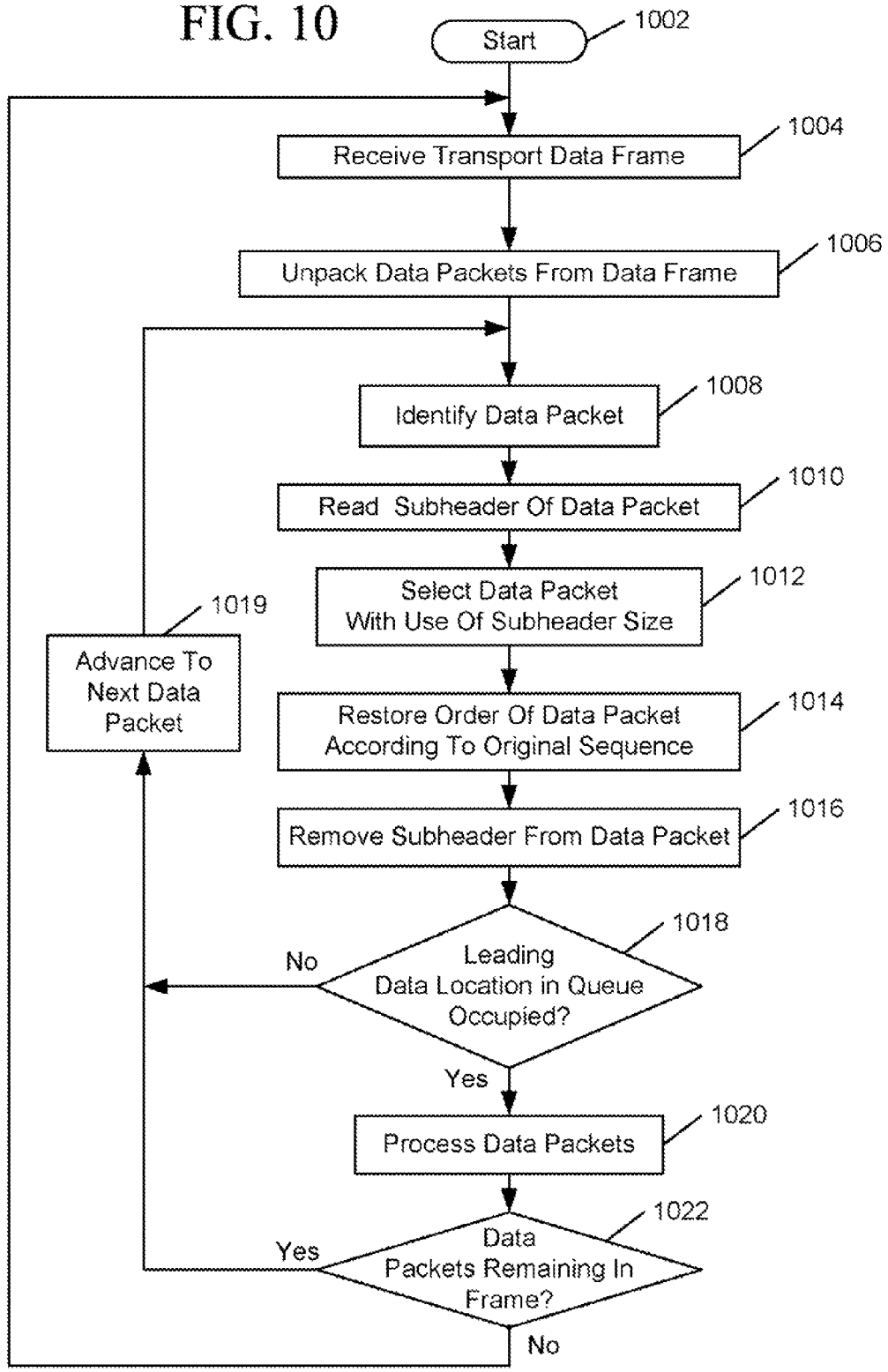
FIG. 10 is a more detailed flowchart of the procedure of FIG. 9 for unpacking and restoring the original order of the data packets from the transport data frame.

FIG. 10 is a more detailed flowchart of the procedure shown in the flowchart of FIG. 9 for unpacking and reordering data packets within an MTU-sized transport data frame. The method may be performed by a wireless communication device, and/or be embodied in a computer program product which includes a storage medium (e.g. memory) and computer instructions stored in the storage medium which are executable by one or more processors. In combination with the flowchart of FIG. 10, reference may be made to the illustrations of the mobile station in FIGS. 1-2, the illustrations of data packets in FIGS. 4-5, and the functional block diagram in FIG. 6. The process described in the flowchart of FIG. 10 describes methods for receiving the transport data frames containing the ordered and grouped data packets described in relation to FIGS. 7 and 8.

Beginning at start block 1002 of FIG. 10, data frame unpacker 610 of FIG. 6 receives a transport data frame via wireless system 608 (step 1004 of FIG. 9). Data frame unpacker 610 unpacks an optimally-packed group of M data packets within the transport data frame (step 1006 of FIG. 10). Unpacking the optimally-packed group of M data packets from the transport data frame includes removing header information associated with the transport data frame. Once the group of optimally-packed M data packets are extracted or unpacked from the transport data frame in step 1006, data packet ungrouper 612 identifies a data packet within the group of M data packets (step 1008 of FIG. 10).

One way of identifying a data packet within the group of M data packets involves pointing to the beginning of the data packet and reading subheader information associated with the selected data packet (step 1010 of FIG. 10). As described earlier above, the subheader associated with a data packet within the group of M data packets may be defined by the particular implementation. For example, if a particular implementation utilizes a predefined subheader size of two octets, with eleven (11) bits allocated to data packet size and five (5) bits allocated to data packet location or sequence number within the original sequence of data packets, data packet ungrouper 612 operates to read and decode two octets as a subheader for the selected data packet. Subheader information may be utilized by data packet ungrouper 612 to select a data packet of specified size according to the subheader information (step 1012 of FIG. 10). The data packet may then be placed in a memory location defined by the subheader corresponding to original sequence location (step 1014 of FIG. 10). The subheader may then be optionally removed or discarded (step 1016 of FIG. 10). Alternatively, the subheader may be retained for later use.

Since, initially, the data packets were in a reordered sequence with respect to the original sequence of data packets, the memory queue may contain unpopulated storage locations while the data packets are being restored to the original sequence. Within the storage queue that contains data packets in an ordered sequence resembling the original sequence of ordered data packets, a first storage location within the memory queue may be referred to and designated as a leading storage location. While this leading storage location is unpopulated (as identified in step 1018 of FIG. 10), re-ordering unit 614 advances to and selects the next data packet in the memory queue (step 1019 of FIG. 10). Once the next data packet is selected, re-ordering unit 614 repeats the process back at step 1008 for selecting and processing data packets based on the subheaders. When the leading storage location in the storage queue is populated as identified in step 1018, all data packets within the storage queue up to a next unpopulated storage location within the storage queue are processed (step 1020 of FIG. 10). The next unpopulated storage location is then designated as the leading storage location. If there are any more existing data packets from the unpacked data frame (as identified in step 1022 of FIG. 10), re-ordering unit 614 again advances to and selects the next data packet in the memory queue at step 1019. Once all data packets within the transport data frame in step 1022 have been processed, additional transport data frames having groups of optimally-packed data packets are received and processed in the same manner starting again at step 1004.

Thus, methods and apparatus for increasing data throughput by grouping data packets into maximum transmissible units of data frames have been described. In an illustrative example, a mobile communication device which operates in a wireless communication system has a wireless transceiver, an antenna coupled to the wireless transceiver, and one or more processors. The one or more processors are operative to receive a plurality of data packets of varying payload size in a queue; associate one or more of the data packets from the queue into a group, such that a total size of the group is at or near a maximum transmissible unit (MTU) size of a data frame; cause the one or more data packets associated into the group to be formatted into the data frame for data transmission in the wireless communication system; and repeat, for a plurality of data frames, the associating and causing, for communicating the data from the wireless transceiver in the wireless communication system. By associating the data packets into groups having the MTU size, data throughput of the data transmission is increased. Preferably, the one or more processors are further operative to rearrange an ordered sequence of the data packets from the queue to better achieve or realize the MTU size for each data frame.

The above-described embodiments of the present disclosure are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in a communication device for communicating data, the method comprising:
   receiving a plurality of transport data packets in an original sequence, each of the plurality of transport data packets having a respective original size;
   performing a non-linear constraint optimization including, associating one or more of the transport data packets into a group, such that a total size of the group is at or near a maximum transmissible unit (MTU) size of a transport data frame, the total size of the group being near the MTU size when the total size of the group is at or above a threshold size;
   when associating, rearranging at least some of the transport data packets with a reordered sequence different from the original sequence, for increasing the total size of the group to be at or near the MTU size, the rearranging comprising:
      when a size of a current candidate transport data packet is less than or equal to an available remaining size in the group, associating the current candidate transport data packet from the queue into the group; and
      otherwise, when the size of the current candidate transport data packet from the queue is greater than the available remaining size in the group, then refraining from associating the current candidate transport data packet into the group and identifying a next transport data packet in the queue as the next current candidate transport data packet for association into the group;
   the associating and rearranging being carried out while maintaining the respective original size of each of the transport data packets in the group;
   formatting the transport data packets of the group having the total size at or near the MTU size into the transport data frame, for data transmission from the communication device; and
   repeating, for a plurality of transport data frames, the acts of associating, rearranging and formatting.

2. The method of claim 1, further comprising:
   for each transport data packet in each transport data frame: creating a subheader in the transport data frame which includes a data packet sequence number of the transport data packet for use in restoring the original sequence of the transport data packets.

3. The method of claim 1, further comprising:
   for each data packet in each data frame, creating a subheader in the data frame which includes at least one of a data packet size and a data packet sequence number of the data packet.

4. The method of claim 1, wherein the plurality of data packets comprises transport data packets, and the MTU size is the maximum size permitted by a logical link controller.

5. The method of claim 1, wherein the nonlinear constraint optimization is performed according to the following relation:

$$\text{MAX } S = \sum_{i=1}^{M}\sum_{j=1}^{N} x_{ij}s_{ij}, \; x_{ij} \in \{0, 1\}$$

$$\text{S.T.} \sum_{i=1}^{M} x_{ij}s_{ij} \le L_{MTU}, \; \forall \; j \in \{1 \; \ldots \; N\}$$

where
S=size of the data frame (in octets);
s=size of a candidate data packet (in octets);
x=Boolean weight of whether or not the candidate data packet can be inserted into the data frame, where x={0, 1}; and
$L_{MTU}$=length of a destination data packet (in octets).

6. The method of claim 1, embodied as a computer program product comprising a computer readable medium and computer instructions stored in the computer readable medium for executing the method.

7. A mobile communication device, comprising:
   a radio frequency transceiver for communicating data;
   one or more processors coupled to the RF transceiver;
   the one or more processors being configured to:
      receive a plurality of transport data packets in an original sequence, each of the transport data packets having a respective original size;
      perform a non-linear constraint optimization including, associating one or more of the transport data packets into a group such that a total size of the group is at or near a maximum transmissible unit (MTU) size of a transport data frame, the total size of the group being near the MTU size when the total size of the group is at or above a threshold size;
      when associating, rearranging at least some of the transport data packets with a reordered sequence different from the original sequence, for increasing the total size of the group to be at or near the MTU size, the rearranging comprising:
         when a size of a current candidate transport data packet, is less than or equal to an available remaining size in the group, associating the current candidate transport data packet from the queue into the group; and
         otherwise, when the size of the current candidate transport data packet from the queue is greater than the available remaining size in the group, then refraining from associating the current candidate transport data packet into the group and identifying a next transport data packet in the queue as the next current candidate transport data packet for association into the group;
      the associating and rearranging being carried out while maintaining the respective original size of each of the transport data packets in the group;
      formatting the transport data packets of the group having the total size at or near the MTU size into the transport data frame, for data transmission from the communication device; and
      repeating, for a plurality of transport data frames, the acts of associating, rearranging and formatting.

8. The mobile communication device of claim 7, wherein the one or more processors are further configured to:

for each transport data packet in each transport data frame:
create a subheader in the transport data frame which includes a data packet sequence number of the transport data packet for use in restoring the original sequence of the transport data packets.

9. The mobile communication device of claim 7, wherein the one or more processors are further configured to, for each data packet in each data frame, create a subheader in the data frame which includes at least one of a data packet size and a data packet sequence number of the data packet.

10. The mobile communication device of claim 7, wherein the plurality of data packets comprises transport data packets, and the MTU size is the size permitted by a logical link controller.

11. The mobile communication device of claim 7, wherein the nonlinear constraint optimization is performed according to the following relation:

$$\text{MAX } S = \sum_{i=1}^{M} \sum_{j=1}^{N} x_{ij} s_{ij}, x_{ij} \in \{0, 1\}$$

$$\text{S.T. } \sum_{i=1}^{M} x_{ij} s_{ij} \leq L_{MTU}, \forall j \in \{1 \ldots N\}$$

where
S=size of the data frame (in octets);
s=size of a candidate data packet (in octets);
x=Boolean weight of whether or not the candidate data packet can be inserted into the data frame, where x={0, 1}; and
$L_{MTU}$=length of a destination data packet (in octets).

12. A non-transitory computer readable medium having tangibly stored thereon computer executable instructions that, when executed by a processor of a communication device, cause the communication device to:
receive a plurality of transport data packets in an original sequence, each of the plurality of transport data packets having a respective original size;
perform a non-linear constraint optimization including:
associating one or more of the transport data packets into a group, such that a total size of the group is at or near a maximum transmissible unit (MTU) size of a transport data frame, the total size of the group being near the MTU size when the total size of the group is at or above a threshold size;
when associating, rearranging at least some of the transport data packets with a reordered sequence different from the original sequence, for increasing the total size of the group to be at or near the MTU size, the rearranging comprising:
when a size of a current candidate transport data packet is less than or equal to an available remaining size in the group, associating the current candidate transport data packet from the queue into the group; and otherwise, when the size of the current candidate transport data packet from the queue is greater than the available remaining size in the group, then refraining from associating the current candidate transport data packet into the group and identifying a next transport data packet in the queue as the next current candidate transport data packet for association into the group;
the associating and rearranging being carried out while maintaining the respective original size of each of the transport data packets in the group;
formatting the transport data packets of the group having the total size at or near the MTU size into the transport data frame, for data transmission from the communication device; and
repeating, for a plurality of transport data frames, the acts of associating, rearranging and formatting.

13. The computer readable medium of claim 12, wherein the instructions, when executed by the processor, further cause the communication device to:
for each transport data packet in each transport data frame:
create a subheader in the transport data frame which includes a data packet sequence number of the transport data packet for use in restoring the original sequence of the transport data packets.

14. The computer readable medium of claim 12, wherein the instructions, when executed by the processor, further cause the communication device to:
for each data packet in each data frame, create a subheader in the data frame which includes at least one of a data packet size and a data packet sequence number of the data packet.

15. The computer readable medium of claim 12, wherein the plurality of data packets comprises transport data packets, and the MTU size is the maximum size permitted by a logical link controller.

16. The computer readable medium of claim 12, wherein the nonlinear constraint optimization is performed according to the following relation:

$$\text{MAX } S = \sum_{i=1}^{M} \sum_{j=1}^{N} x_{ij} s_{ij}, x_{ij} \in \{0, 1\}$$

$$\text{S.T. } \sum_{i=1}^{M} x_{ij} s_{ij} \leq L_{MTU}, \forall j \in \{1 \ldots N\}$$

where
S =size of the data frame (in octets);
s =size of a candidate data packet (in octets);
x =Boolean weight of whether or not the candidate data packet can be inserted into the data frame, where x ={0, 1}; and
$L_{MTU}$=length of a destination data packet (in octets).

* * * * *